United States Patent [19]

Wolfert

[11] Patent Number: 5,183,648

[45] Date of Patent: Feb. 2, 1993

[54] PROCESS FOR PREPARING MAGNESIA HAVING REDUCED HYDRATION TENDENCY, HYDRATION RESISTANT MAGNESIA, DRY MIXTURE FOR PREPARING MAGNESIA BASED CASTABLES AND MAGNESIA BASED CASTABLE

[75] Inventor: Anthony J. Wolfert, Arnhem, Netherlands

[73] Assignee: Shell Research Limited, United Kingdom

[21] Appl. No.: 665,794

[22] Filed: Mar. 8, 1991

[30] Foreign Application Priority Data

Mar. 15, 1990 [GB] United Kingdom ............... 9005815

[51] Int. Cl.⁵ ............................................. C01F 5/02
[52] U.S. Cl. .................................... 423/267; 106/801; 423/268; 423/275; 423/635; 423/636
[58] Field of Search ............... 423/275, 635, 636, 267, 423/268

[56] References Cited

U.S. PATENT DOCUMENTS

| | | |
|---|---|---|
| 1,881,283 | 10/1932 | Lukens ................................ 423/636 |
| 3,598,618 | 8/1971 | Fujii et al. |
| 3,892,580 | 7/1975 | Messing. |
| 4,423,026 | 12/1983 | Snellgrove. |
| 4,443,425 | 4/1984 | Sopp et al. ............................ 423/635 |

FOREIGN PATENT DOCUMENTS

| | | | |
|---|---|---|---|
| 895771 | 3/1972 | Canada ................................ 423/635 |
| 2431845 | 9/1975 | Fed. Rep. of Germany ...... 423/636 |
| 246971 | 6/1987 | Fed. Rep. of Germany ...... 423/636 |
| 140025 | 11/1981 | Japan ................................ 423/636 |
| 34022 | 2/1982 | Japan ................................ 423/636 |
| 118018 | 7/1982 | Japan ................................ 423/636 |
| 200824 | 10/1985 | Japan ................................ 423/635 |
| 270213 | 11/1986 | Japan ................................ 423/636 |
| 7213378 | 4/1973 | Netherlands ........................ 423/636 |
| 617420 | 2/1949 | United Kingdom ................ 423/635 |

Primary Examiner—Wayne Langel

[57] ABSTRACT

The invention concerns a process for preparing magnesia having reduced hydration tendency, wherein magnesia particles are treated with a solution of an inorganic acid, an organic acid an/or salts thereof, as well as hydration resistant magnesia thus obtained, a dry mixture for preparing magnesia based castables and magnesia based castables containing magnesia thus obtained.

9 Claims, No Drawings

PROCESS FOR PREPARING MAGNESIA HAVING REDUCED HYDRATION TENDENCY, HYDRATION RESISTANT MAGNESIA, DRY MIXTURE FOR PREPARING MAGNESIA BASED CASTABLES AND MAGNESIA BASED CASTABLE

The present invention is concerned with a process for preparing magnesia having reduced hydration tendency, with hydration resistant magnesia, with a dry mixture for preparing magnesia based castables and with a magnesia based castable.

The major application of refractory grade magnesia, is in refractory bricks which are mainly applied in the steel and cement industry. In the steel industry the major application of magnesia based bricks is in the Basic Oxygen Furnace (BOF) and the electric arc furnace (EAF) In other parts of the steel making process the application of magnesia based materials is increasing One of the growth areas is the steel making ladle. Mainly formed products (bricks) are used in this application. Lining these ladles with bricks is time consuming and labor intensive and thus expensive. It could be advantageous to use magnesia based castables instead of magnesia based bricks. Installation of a monolithic lining by casting or vibro casting is less time consuming and less labor intensive than the installation of a brick lining. But drying and curing of a monolithic lining is more troublesome. One of the major problems is hydration of magnesia during drying of the installed lining.

A serious problem in the application of magnesia based castables is the tendency of the magnesia to hydrate to magnesium. hydroxide. The formation of magnesiumhydroxide from magnesiumoxide is accompanied by a volume expansion. Owing to this volume expansion large cracks can be formed in the installed lining. In most cases the presence of such large cracks is detrimental for the lifetime of the installed lining It is known that for magnesia based castables in which the bonding system contains boric acid, the sensitivity of the material towards hydration is reduced. The boric acid content (analysed as $B_2O_3$) of such materials can be up to 3% (m/m). However the presence of boronoxide reduces the refractoriness of the castable to a large extent. Therefore such castables are not attractive materials for applications at temperatures over 1400° C. For high quality magnesia based materials, which can be applied at temperatures over 1600.C, the boron content should not exceed 0.05% (m/m). Castables on the basis of such high quality magnesia grades are not yet available, due to the problem of hydration.

It is thus an object of the invention to provide a process for preparing magnesia having reduced hydration tendency.

According to the invention a process for preparing magnesia having reduced hydration tendency is provided. comprising treating magnesia particles with a solution of an inorganic acid, an organic acid an/or salts thereof.

Surprisingly it has been found, that with this very easy process it is possible to reduce the hydration tendency of the magnesia particles to a large extent.

According to a preferred embodiment, an organic acid is used, preferably chosen from the group of oxalic acid, citric acid, formic acid, acetic acid and malic acid.

In another embodiment inorganic compounds like boric acid. boronoxide and ammonium-phosphate are used. The advantages of the use of these products lies therein, that a large decrease of the hydration tendency is obtained The treatment of the magnesia particles is preferably done with a solution of the inorganic acid, the organic acid an/or the salts thereof. The amount of dissolved acid or salt is preferably not more than 5M, more in particular at least 0.01M and most preferred between 0.01 and 2.0M. With these amounts the hydration tendency is optimally reduced. As solvent either water or an organic solvent can be used. The organic solvent is preferably ethanol.

The conditions at which the treatment is carried out are not very critical. It usually suffices to treat the magnesia particles at room temperature, for about ten minutes with the solution. The temperature may vary between 10° and 50° C. although higher or lower temperatures are also possible. The time for treatment may be as short as 10 seconds, but may also be up to one hour After the treatment the magnesia particles are separated from the solution and dried. This drying can be done under conventional conditions, preferably between 50° and 150° C.

The invention is also concerned with refractory grade magnesia produced by the process of the invention, which magnesia preferably has a boronoxide content of less than 0.025 wt %, a magnesia content of at least 95% (m/m). and a bulk density of at least 3350 kg/m$^3$.

It is remarked that from U.S. Pat. No. 3,598,618 the preparation of porous magnesia grains is known having a density of about 800 kg/m$^3$. This process comprises the treatment of magnesia powder with a strong acid, such as glacial acetic acid, resulting in a strong foaming of the powder. This process differs clearly from the present invention both from the point of view of the method employed and the product obtained. According to the invention the density will be at least 3000 kg/m$^3$, with substantially no foaming, whereas the use of such strong acids is not contemplated.

The magnesia is preferably used in the form of crushed or ground particles, which are obtained from briquettes or pellets of refractory grade. The treatment has to be carried out on the particles as they are used in the castables. i.e. not on particles that are subsequently further crushed or ground, as the free surface of the particles has to be treated. Suitable particle sizes for magnesia that is to be used for magnesia based castables range from 0.01 to 10 mm.

The treated particles can advantageously be used for preparing a dry mixture for preparing magnesia based castables, also comprising at least one binder and further additives, such as those conventionally used in castables for this application. Suitable binders are cement materials that react with water and suitable additives are flow promoters The dry mixture, or the separate components can be used for preparing magnesia based castables, by addition of a suitable amount of water. Suitable amounts of water are between 2 and 10 wt. % based on the amount of dry material. The castable can be used for casting refractory materials, such as linings for ladles and the like.

After hardening, the casted material is fired to obtain the final refractory material, during which firing also the residues of the acids and/or salts thereof are removed. As especially the residue of metal ions may have a negative effect on the maximum allowable operating temperature of the refractory material, it has the preference to use as acid and/or salt only those materials that do not leave any residue after firing, such as those acids and/or salts that decompose to volatile components on firing.

The invention is now elucidated on the basis of examples without being restricted thereto.

EXAMPLES

Briquettes of refractory grade magnesias were broken to particles of between 0.3 and 0.6 mm. Samples of these particles were for ten minutes, at ambient temperature immersed in various solutions. After this the particles were separated from the liquid and dried at 100° C. In order to determine the resistance against hydration, the treated particles were subjected to 24 hours of steam of 100° C. The grade of conversion of MgO to magnesiumhydroxide after this treatment is given in the table in % (mol/mol) which conversion is a measure for the hydration resistance, i.e. the higher the conversion, the lesser the hydration resistance.

As a comparison, only a treatment with water is given, which value can be considered to be equivalent to the hydration of untreated magnesia.

| solution | concentration | conversion grade MgO into Mg(OH)$_2$ % (mol/mol) |
|---|---|---|
| H$_3$BO$_3$/water | 10.3% (m/m) | 0.8 |
| H$_3$BO$_3$/water | saturated | 0.4 |
| B$_2$O$_3$/water | 3.6% (m/m) | 0.5 |
| B$_2$O$_3$/water | saturated | 0.4 |
| H$_3$BO$_3$/ethanol | 6.3% (m/m) | 0.2 |
| H$_3$BO$_3$/ethanol | saturated | 0.1 |
| EDTA/water | 0.05 M | 22 |

-continued

| solution | concentration | conversion grade MgO into Mg(OH)$_2$ % (mol/mol) |
|---|---|---|
| (NH$_4$)$_2$HPO$_4$/water | 0.1 M | 6.7 |
| (NH$_4$)$_2$HPO$_4$/water | 1 M | 3.6 |
| Na$_2$HPO$_4$/water | 0.1 M | 4.8 |
| Na$_2$HPO$_4$/water | 1 M | 1.8 |
| Citric acid/water | 0.1 M | 2.9 |
| Citric acid/water | 1 M | 2.0 |
| Acetic acid/water | 0.1 M | 3.2 |
| Acetic acid/water | 1 M | 2.3 |
| Oxalic acid/water | 0.1 M | 3.9 |
| water | | 33.0 |

I claim:

1. A process for preparing magnesia having a reduced hydration tendency, comprising contacting particles of refractory grade magnesia with a 0.01M to 5M solution of an inorganic acid or salt thereof, recovering the treated magnesia, and drying the treated magnesia.

2. A process according to claim 1, wherein said solution ranges from 0.01 to 2M.

3. A process according to claim 1, wherein said magnesia is treated with ammonium phosphate.

4. A process according to claim 1, wherein said magnesia is treated with an aqueous solution of said inorganic acid or salt thereof.

5. A process according to claim 1, wherein said magnesia is treated with a solution of boric acid in ethanol.

6. A process according to claim 1, wherein said magnesia is treated with an aqueous solution of boric acid.

7. A process according to claim 1, wherein said magnesia is treated with an aqueous solution of boron oxide.

8. A process according to claim 1, wherein said magnesia is treated with an ethanol solution of boron oxide.

9. A process according to claim 1, wherein said magnesia is treated with sodium phosphate.

* * * * *

UNITED STATES PATENT AND TRADEMARK OFFICE
CERTIFICATE OF CORRECTION

PATENT NO. : 5,183,648

DATED : February 2, 1993

INVENTOR(S) : WOLFERT

It is certified that error appears in the above-identified patent and that said Letters Patent is hereby corrected as shown below:

On the cover page of the patent, the inventor, "[75] Inventor: Anthony J. Wolfert, Arnhem, Netherlands" should read
--[75] Inventor: Anthonij Wolfert, Arnhem, Netherlands--.

Signed and Sealed this

Twenty-third Day of November, 1993

Attest:

BRUCE LEHMAN

*Attesting Officer*   *Commissioner of Patents and Trademarks*